(12) United States Patent
Batchelder et al.

(10) Patent No.: US 10,421,268 B2
(45) Date of Patent: Sep. 24, 2019

(54) FILAMENT FEEDING DEVICE HAVING A CAPACITIVE FILAMENT DISPLACEMENT SENSOR FOR USE IN ADDITIVE MANUFACTURING SYSTEM

(71) Applicant: Stratasys, Inc., Eden Prairie, MN (US)

(72) Inventors: J. Samuel Batchelder, Somers, NY (US); William J. Swanson, St. Paul, MN (US)

(73) Assignee: STRATASYS, INC., Eden Prairie, MN (US)

( * ) Notice: Subject to any disclaimer, the term of this patent is extended or adjusted under 35 U.S.C. 154(b) by 306 days.

(21) Appl. No.: 15/355,441

(22) Filed: Nov. 18, 2016

(65) Prior Publication Data

US 2017/0136707 A1 May 18, 2017

Related U.S. Application Data

(60) Provisional application No. 62/257,026, filed on Nov. 18, 2015.

(51) Int. Cl.
| | | |
|---|---|---|
| *B29C 67/00* | (2017.01) | |
| *B33Y 40/00* | (2015.01) | |
| *B33Y 50/02* | (2015.01) | |
| *B33Y 30/00* | (2015.01) | |
| *B29C 64/209* | (2017.01) | |
| *B29C 64/393* | (2017.01) | |
| *B29C 64/321* | (2017.01) | |
| *B29C 64/118* | (2017.01) | |
| *B29C 64/40* | (2017.01) | |

(52) U.S. Cl.
CPC ............ *B33Y 50/02* (2014.12); *B29C 64/118* (2017.08); *B29C 64/209* (2017.08); *B29C 64/321* (2017.08); *B29C 64/393* (2017.08); *B33Y 30/00* (2014.12); *B33Y 40/00* (2014.12); *B29C 64/40* (2017.08)

(58) Field of Classification Search
CPC ......... B33Y 50/02; B33Y 30/00; B33Y 40/00; B29C 64/118; B29C 64/321; B29C 64/393; B29C 64/209; B29C 64/40
See application file for complete search history.

(56) References Cited

U.S. PATENT DOCUMENTS

| | | | | |
|---|---|---|---|---|
| 4,523,938 | A * | 6/1985 | Grego | .................... G01B 7/125 65/158 |
| 4,974,296 | A * | 12/1990 | Vidler | ...................... D01H 5/38 19/239 |
| 6,547,995 | B1 | 4/2003 | Comb | |
| 8,221,669 | B2 | 7/2012 | Batchelder et al. | |
| 2010/0283172 | A1 | 11/2010 | Swanson | |
| 2011/0074065 | A1 | 3/2011 | Batchelder et al. | |
| 2012/0070523 | A1 | 3/2012 | Swanson et al. | |
| 2012/0164256 | A1 | 6/2012 | Swanson et al. | |

(Continued)

Primary Examiner — Nahida Sultana
(74) Attorney, Agent, or Firm — Westman, Champlin & Koehler, P.A.

(57) ABSTRACT

A filament feeding device includes a drive mechanism and a displacement sensor. The drive mechanism is configured to feed a filament along a feed path. The displacement sensor is positioned adjacent the feed path and is configured to determine a velocity and direction in which the filament is fed along the feed path based on at least two capacitance measurements that vary in response to movement of the filament along the feed path.

13 Claims, 3 Drawing Sheets

(56) References Cited

U.S. PATENT DOCUMENTS

| | | |
|---|---|---|
| 2013/0078073 A1 | 3/2013 | Comb et al. |
| 2013/0161432 A1 | 6/2013 | Mannella et al. |
| 2013/0161442 A1 | 6/2013 | Mannella et al. |
| 2014/0048970 A1* | 2/2014 | Batchelder .......... B29C 67/0055 264/129 |
| 2017/0122322 A1* | 5/2017 | Zinniel .................... F04D 3/02 |

* cited by examiner

FILAMENT FEEDING DEVICE HAVING A CAPACITIVE FILAMENT DISPLACEMENT SENSOR FOR USE IN ADDITIVE MANUFACTURING SYSTEM

CROSS REFERENCE TO RELATED APPLICATION(S)

This application claims the benefit of U.S. Provisional Patent Application Ser. No. 62/257,026 entitled FILAMENT FEEDING DEVICE HAVING A CAPACITIVE FILAMENT DISPLACEMENT SENSOR FOR USE IN AN ADDITIVE MANUFACTURING SYSTEM which was filed on Nov. 18, 2015, the contents of which are incorporated by reference in its entirety

BACKGROUND

The present disclosure relates to additive manufacturing systems for printing or otherwise building three-dimensional (3D) parts with layer-based, additive manufacturing techniques. In particular, the present disclosure relates to filament drive mechanisms for use in extrusion-based additive manufacturing systems.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through a liquefier assembly carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second liquefier assembly pursuant to the generated geometry during the printing process. The support material adheres to the part material during fabrication, and is removable from the completed 3D part when the printing process is complete.

SUMMARY

An aspect of the present disclosure is directed to a filament feeding device for use in feeding a filament into a liquefier assembly of an extrusion-based digital manufacturing system. In one embodiment, the filament feeding device includes a drive mechanism and a displacement sensor. The drive mechanism is configured to feed a filament along a feed path. The displacement sensor is positioned adjacent the feed path and is configured to determine a velocity and direction that the filament is fed along the feed path based on at least two capacitance measurements that vary in response to movement of the filament along the feed path.

Another aspect of the present disclosure is directed to a method of sensing a velocity and direction in which a filament is fed into a liquefier assembly of an extrusion-based digital manufacturing system. In one embodiment of the method, the filament is fed along a feed path using a drive mechanism. A first capacitance is sensed using a first sense electrode positioned adjacent the feed path. A second capacitance is sensed using a second sense electrode positioned adjacent the feed path. The velocity and direction in which the filament is being fed along the feed path is determined using a processor of a processing unit based on the first and second sensed capacitances. The velocity and a known cross-sectional area of the filament can be used to determine a volumetric flow rate of the filament into the liquefier assembly.

Another aspect of the present disclosure is directed to a 3D printer where the 3D print includes a liquefier assembly having a liquefier tub having an inlet end and a nozzle for extruding a filament feedstock. The liquefier assembly includes a heating element configured to heat the feedstock to a molten state within the liquefier tube. The 3D printer includes a filament feeding device for use in feeding a filament into a liquefier assembly of an extrusion-based digital manufacturing system. The filament feeding assembly has a drive mechanism configured to feed the filament feedstock along a feed path and a displacement sensor adjacent the feed path. The displacement sensor is configured to determine a velocity and direction in which the filament feedstock is fed along the feed path based on at least two capacitance measurements that vary in response to movement of the filament along the feed path. The 3D printer includes a platen configured to receive the molten extruded feedstock in to print a 3D part in a layer by layer manner. The 3D printer also includes a processing unit comprising a processor configured to determine the velocity and the direction in which the filament is fed along the feed path based on signals correlating to the first and second sensed capacitances.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Definitions

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

DETAILED DESCRIPTION

The present disclosure is directed to a filament feeding device for use with an additive manufacturing system for feeding consumable filaments, such as part and support material filaments, into a liquefier assembly, and determining a velocity and direction in which the filaments are fed along a feed path. The velocity and direction in which the filaments are fed along the feed path is useful in determining the volumetric flow rate of the filament through the liquefier assembly, as well as to detect errors in the feeding of the filament into the liquefier assembly. For example, when the measured filament velocity is significantly less than the expected velocity, a loss of extrusion may be detected.

Figure 1:
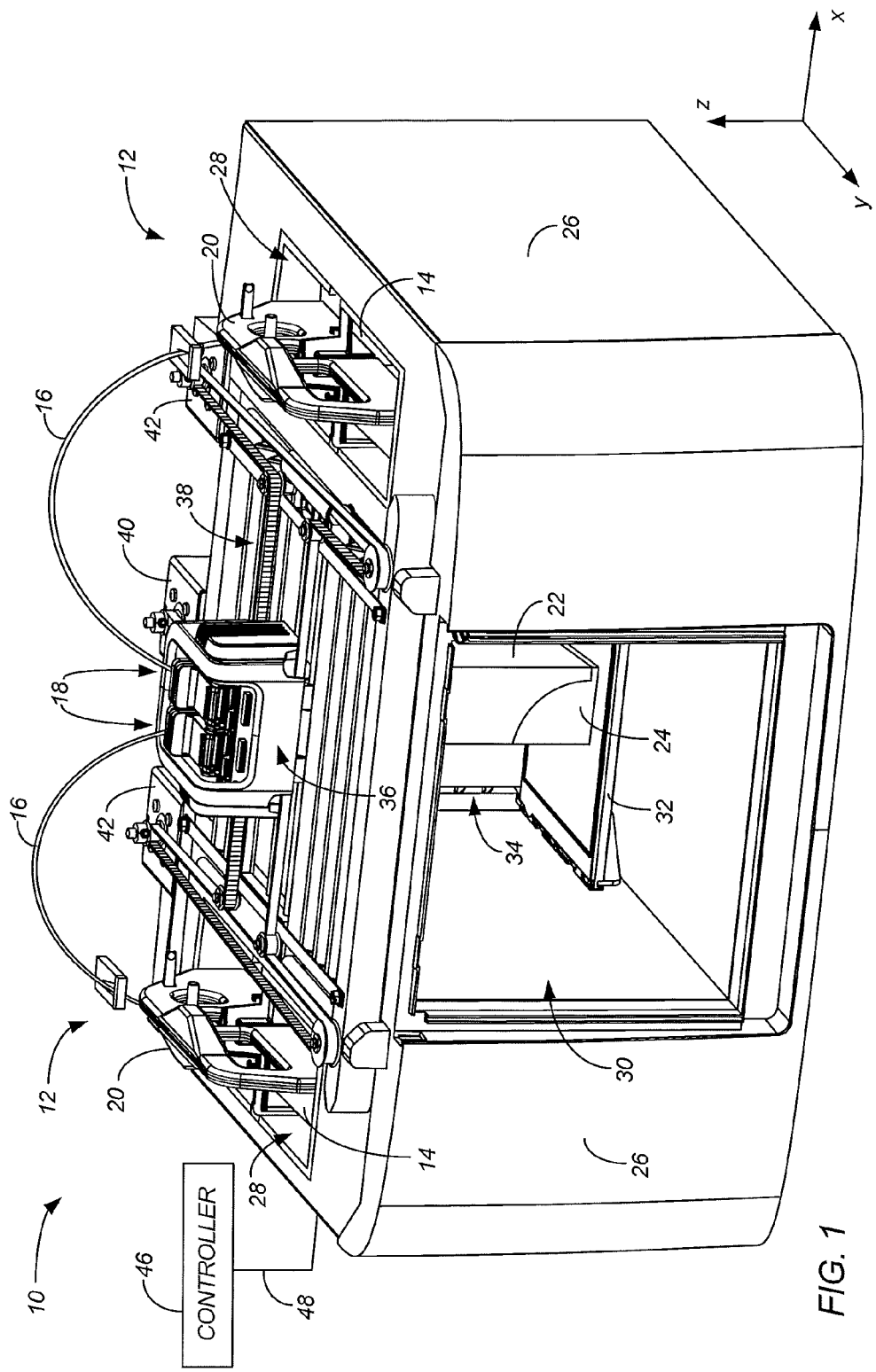
FIG. 1 is a top, front perspective view of an additive manufacturing system, in accordance with embodiments of the present disclosure.

FIG. 1 is a top, front perspective view of an exemplary additive manufacturing system, with which a filament feeding device in accordance with embodiments of the present disclosure may be used. In some embodiments, system 10 uses exemplary consumable assemblies 12, which may comprise an easily loadable, removable, and replaceable container device that retains a supply of a consumable filament for printing with system 10. Typically, one of the consumable assemblies 12 contains a part material filament ("part material consumable assembly"), and the other consumable assembly 12 contains a support material filament ("support material consumable assembly"). However, both consumable assemblies 12 may be identical in structure.

In the shown embodiment, each consumable assembly 12 includes container portions 14, guide tubes 16, print heads 18, and handles 20. In some embodiments, each print head 18 includes a filament feeding device in accordance with one or more embodiments of the present disclosure. Container portion 14 may retain a spool or coil of a consumable filament, such as discussed in Mannella et al., U.S. Patent Application Nos. 2013/0161442 and 2013/0161432. Guide tube 16 interconnects container portion 14 and print head 18, where the drive mechanism of print head 18 draws successive segments of the consumable filament from container portion 14 and through guide tube 16.

In this embodiment, guide tube 16 and print head 18 are subcomponents of consumable assembly 12, and may be interchanged to and from system 10 with each consumable assembly 12. In alternative embodiments, guide tube 16 and/or print head 18 may be components of system 10, rather than subcomponents of consumable assemblies 12.

System 10 is an additive manufacturing system for printing 3D parts or models and corresponding support structures (e.g., 3D part 22 and support structure 24) from the part and support material filaments, respectively, of consumable assemblies 12, using a layer-based, additive manufacturing technique. Suitable additive manufacturing systems for system 10 include extrusion-based systems developed by Stratasys, Inc., Eden Prairie, Minn. under the "FDM" trademark. As shown, system 10 includes system casing 26, two bays 28, chamber 30, platen 32, platen gantry 34, head carriage 36, head gantry 38, z-axis motor 40, and a pair of x-y motors 42.

System casing 26 is a structural component of system 10 and may include multiple structural sub-components such as support frames, housing walls, and the like. In the shown embodiment, system casing 26 defines the dimensions of bays 28, and of chamber 30. Bays 28 are container bays configured to respectively receive container portions 14 of consumable assemblies 12. Typically, each of bays 28 may be intended to receive either a part material consumable assembly 12 or a support material consumable assembly 12.

In an alternative embodiment, bays 28 may be omitted to reduce the overall footprint of system 10. In this embodiment, container portions 14 may stand adjacent to system casing 26, while providing sufficient ranges of movement for guide tubes 16 and print heads 18. Bays 28, however, provide convenient locations for loading consumable assemblies 12.

Chamber 30 is an enclosed environment that contains platen 32 for printing 3D part 22 and support structure 24. Chamber 30 may be heated (e.g., with circulating heated air) to reduce the rate at which the part and support materials solidify after being extruded and deposited (e.g., to reduce distortions and curling). In alternative embodiments, chamber 30 may be omitted and/or replaced with different types of build environments. For example, 3D part 22 and support structure 24 may be built in a build environment that is open to ambient conditions or may be enclosed with alternative structures (e.g., flexible curtains).

Platen 32 is a platform on which 3D part 22 and support structure 24 are printed in a layer-by-layer manner, and is supported by platen gantry 34. In some embodiments, platen 32 may also include a flexible polymeric film or liner on which 3D part 22 and support structure 24 are printed. Platen gantry 34 is a gantry assembly configured to move platen 32 along (or substantially along) the vertical z-axis and is powered by z-axis motor 40.

Head carriage 36 is a unit configured to receive one or more removable print heads, such as print heads 18, and is supported by head gantry 38, as shown in the exemplary embodiment. Examples of suitable devices for head carriage 36, and techniques for retaining print heads 18 in head carriage 36, include those disclosed in Swanson et al., U.S. Publication Nos. 2010/0283172 and 2012/0164256.

In the shown exemplary embodiment, head gantry 38 is a belt-driven gantry assembly configured to move head carriage 36 (and the retained print heads 18) in (or substantially in) a horizontal x-y plane above chamber 30, and is powered by x-y motors 42. Examples of suitable gantry assemblies for head gantry 38 include those disclosed in Comb et al., U.S. Publication No. 2013/0078073.

In an alternative embodiment, platen 32 may be configured to move in the horizontal x-y plane within chamber 30, and head carriage 36 (and print heads 18) may be configured to move along the z-axis. Other similar arrangements may also be used such that one or both of platen 32 and print heads 18 are moveable relative to each other. Platen 32 and head carriage 36 (and print heads 18) may also be oriented along different axes. For example, platen 32 may be oriented vertically and print heads 18 may print 3D part 22 and support structure 24 along the x-axis or the y-axis.

System 10 also includes controller 46, which represents one or more control circuits comprising one or more processors that are configured to monitor and operate the components of system 10 to perform one or more functions or method steps described herein. For example, one or more of the control functions performed by controller 46 can be implemented in hardware, software, firmware, and the like, or a combination thereof. Controller 46 may communicate over communication line 48 with print heads 18, chamber 30 (e.g., with a heating unit for chamber 30), head carriage 36, motors 40 and 42, and various sensors, calibration devices, display devices, user input devices, and/or other components of the system 10. In some embodiments, controller 46 may also communicate with one or more of bays 28, platen 32, platen gantry 34, head gantry 38, and any other suitable component of system 10.

While illustrated as a single signal line, communication line 48 may include one or more electrical, optical, and/or wireless signal lines, allowing controller 46 to communicate with various components of system 10. Furthermore, while illustrated outside of system 10, controller 46 and communication line 48 may be internal components to system 10. System 10 and/or controller 46 may also communicate with one or more computer-based systems (not shown), which may include computer-based hardware, such as data storage devices, processors, memory modules and the like for generating, storing, and transmitting tool path and related printing instructions to system 10.

During operation, controller 46 may direct z-axis motor 40 and platen gantry 34 to move platen 32 to a predetermined height within chamber 30. Controller 46 may then direct motors 42 and head gantry 38 to move head carriage 36 (and the retained print heads 18) around in the horizontal x-y plane above chamber 30. Controller 46 may also direct the filament feeding devices of the present disclosure, located in print heads 18, to selectively draw successive segments of the consumable filaments from container portions 14 and through guide tubes 16, respectively.

Each print head 18 thermally melts the successive segments of the received consumable filament such that it becomes a molten material, thereby allowing the molten material to be extruded and deposited onto platen 32 for printing 3D part 22 and support structure 24 in a layer-by-layer manner. After the print operation is complete, the resulting 3D part 32 and support structure 24 may be removed from chamber 30, and support structure 24 may be removed from 3D part 22. 3D part 22 may then undergo one or more additional post-processing steps.

Figure 2:
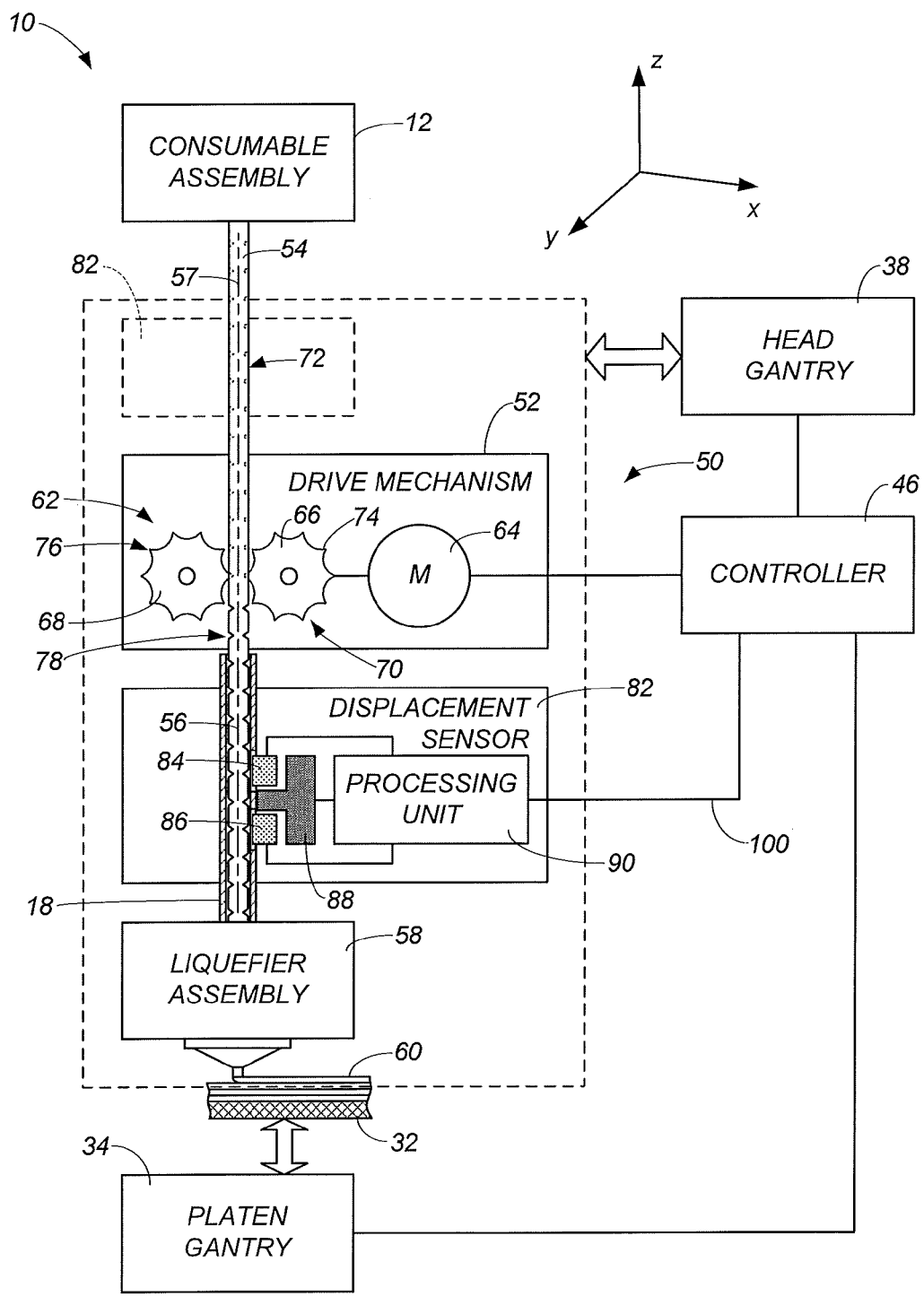
FIG. 2 is a simplified diagram of portions of an additive manufacturing system including an exemplary print head that includes a filament feeding device formed in accordance with embodiments of the present disclosure.

FIG. 2 is a simplified diagram of portions of an additive manufacturing system 10 including an exemplary print head 18 that includes a filament feeding device 50 formed in accordance with embodiments of the present disclosure. Filament feeding device 50 includes a filament drive mechanism 52 that feeds filament 54 supplied by consumable assembly 12 along a feed path 56, which is generally aligned with a longitudinal axis 57 of filament, into a liquefier assembly 58, where filament 54 is melted. The unmelted portion of filament 54 provides a viscosity-pump action to extrude the molten filament material from liquefier assembly 58 to print a 3D part 60, where the extrusion rate is based on the feed rate of filament 54 into liquefier assembly 58 using drive mechanism 52, such as discussed in Comb, U.S. Pat. No. 6,547,995.

Filament 54 may be in any desired form. Filament 54 is formed of conventional filament materials. In one exemplary embodiment, filament 54 is formed of a material that includes Acrylonitrile-Butadiene-Styrene (ABS). Filament 54 may also have a variety of cross-sectional shapes. For example, in some embodiments, filament 54 has a substantially cylindrical geometry (i.e., a substantially circular cross-section). In some embodiments, filament 54 may have an average diameter ranging from about 1.0 millimeter (about 0.04 inches) to about 3.0 millimeters (about 0.12 inches). In some embodiments, filament 54 has a non-cylindrical geometry, such as a ribbon filament as disclosed in Batchelder et al., U.S. Pat. No. 8,221,669. In accordance with this embodiment, print head 18 may include a ribbon liquefier assembly as disclosed in Batchelder et al., U.S. Application Publication No. 2011/0074065; and in Swanson et al., U.S. Application Publication No. 2012/0070523.

Filament drive mechanism 52 includes a filament drive 62 that engages filament 54, and a motor 64 that moves filament drive 62 to drive filament 54 in a desired direction along feed path 56. In one exemplary embodiment, filament drive 62 includes at least one drive wheel, such as drive wheel 66. In some exemplary embodiments, the drive wheel 66 can take the form of a spur gear or a capstan. In some embodiments, filament drive 62 includes a second wheel 68, such as a drive wheel or an idler wheel, that also engages filament 54, as shown in FIG. 2. Motor 64 may be configured to drive rotation of at least drive wheel 66 through, for example, a suitable gear assembly, under the control of controller 46 to feed filament 54 in a desired direction along feed path 56 and into the liquefier assembly 58. It is understood that filament drive 62 may take on other forms while performing the desired filament feeding function. Thus, while exemplary embodiments will be described with reference to the drive wheel embodiment, it is understood that embodiments include other forms of filament drive 62.

The feed rate of filament 54 into liquefier assembly 58 is based on the movement of filament drive 62, such as the rotational velocity of drive wheel 66, and the engagement between filament 54 and filament drive 62. Slippage between filament 54 and filament drive 62 can disrupt the extrusion rate of the filament material from liquefier assembly 58. For example, filament slippage can occur when filament 54 is subjected to back pressures within liquefier assembly 58 that exceed the frictional grip that filament drive 62 has on filament 54. If this occurs, the change in the extrusion rate of the filament material may impair the quality of 3D part 60.

In some embodiments, filament drive 62 (e.g., drive wheel 66) includes a textured engagement surface 70 that engages the exterior surface 72 of filament 54. Textured engagement surface 70 increases the frictional grip of filament 54, and the driving force drive wheel 66 can apply to filament 54 along the feed path 56. As a result, textured engagement surface 70 reduces the risk of filament slippage.

In some exemplary embodiments, textured surface 70 comprises a plurality of teeth 74, such as radial teeth, that extend over the circumferential surface of drive wheel 66 and engage exterior surface 72 of filament 54 during feeding of filament 54 using drive mechanism 62. Other exemplary forms for textured surface 70 include a linearly knurled surface, a diamond-knurled surface, or other suitable textured surface. In some embodiments, drive or idler wheel 68 includes a textured engagement surface 76 that engages exterior surface 72 of filament 54, that is the same or similar to textured surface 70 of drive wheel 56.

Figure 3:
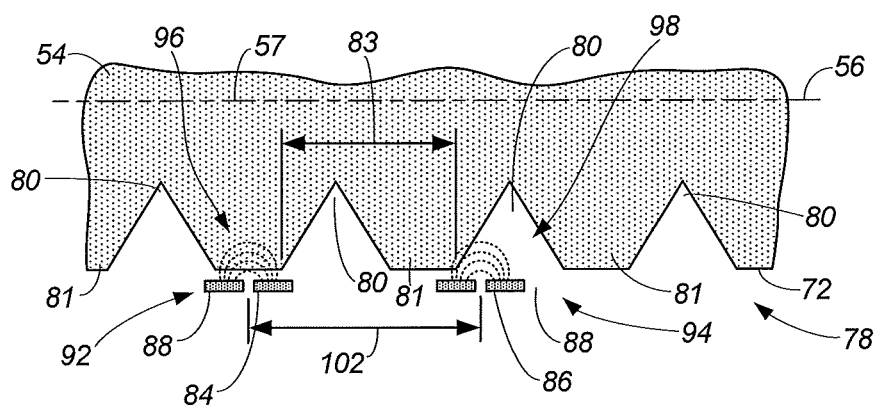
FIG. 3 is a magnified side cross-sectional view of a portion of a filament and a displacement sensor, in accordance with embodiments of the present disclosure.

In some embodiments, textured surface 70 bites into exterior surface 72 of filament 54 during feeding of filament 54 along feed path 56. In some embodiments, this results in the formation of a textured pattern 78 on exterior surface 72 along feed path 56, as indicated in FIG. 2 and shown in the magnified side cross-sectional view of filament 54 provided in FIG. 3. In some embodiments, pattern 78 includes a series of detents or valleys 80 and peaks 81 in exterior surface 72, as shown in FIG. 3. Thus, in some embodiments, the pattern 78 is created through the engagement between filament drive 62 and surface 70 of filament 54 during the feeding of filament 54 along feed path 56.

In some embodiments, textured pattern 78, such as one having detents 80, is prefabricated on surface 72 of filament 54, as indicated in phantom lines in FIG. 2. In accordance with this embodiment, the prefabricated pattern 78 may be configured to increase the force filament drive 62 can apply to filament 54 along feed path 56, such as through an intermeshing of teeth of filament drive 62 with detents 80 of pattern 78.

In some embodiments, textured pattern 78 that is either prefabricated on surface 72 of filament 54, or is formed through engagement between surface 72 of filament 54 and textured surface 70 of filament drive 62, is a periodic pattern along the axis of feed path 56. For example, detents 80 forming pattern 78 may be uniformly separated from each other, such as due to uniformly spaced teeth 74 of the textured surface 70 of filament drive 62 that form the pattern 78. This forms a periodic pattern 78 having a period length 83, as shown in FIG. 3.

In some embodiments filament feeding device 50 includes a displacement sensor 82 that is positioned adjacent feed path 56 and is configured to determine, or is used by controller 46 to determine, a velocity and direction in which filament 54 is fed along feed path 56, as shown in FIG. 2. In some embodiments, displacement sensor 82 determines the velocity and direction in which filament 54 is fed along feed path 56 based on at least two capacitance measurements that vary in response to movement of filament 54 along feed path 56.

Displacement sensor 82 may be formed on a circuit board (not shown) that is secured adjacent to feed path 56. In some embodiments, displacement sensor 82 includes a sense electrode 84, a sense electrode 86, at least one excitation electrode 88, and a processing unit 90. In some embodiments, sense electrode 84, sense electrode 86, and excitation electrode 88 are conductive plates that extend substantially parallel to each other and are operably coupled to processing unit 90. In some embodiments, sense electrode 84, sense electrode 86, and the at least one excitation electrode 88 may be formed of a copper top layer of a solid or flex printed circuit board, for example. In some embodiments, sense electrode 84 and sense electrode 86 have substantially the same dimensions. In some embodiments, sense electrodes 84 and 86 have a length of approximately 10 mils.

Figure 4:
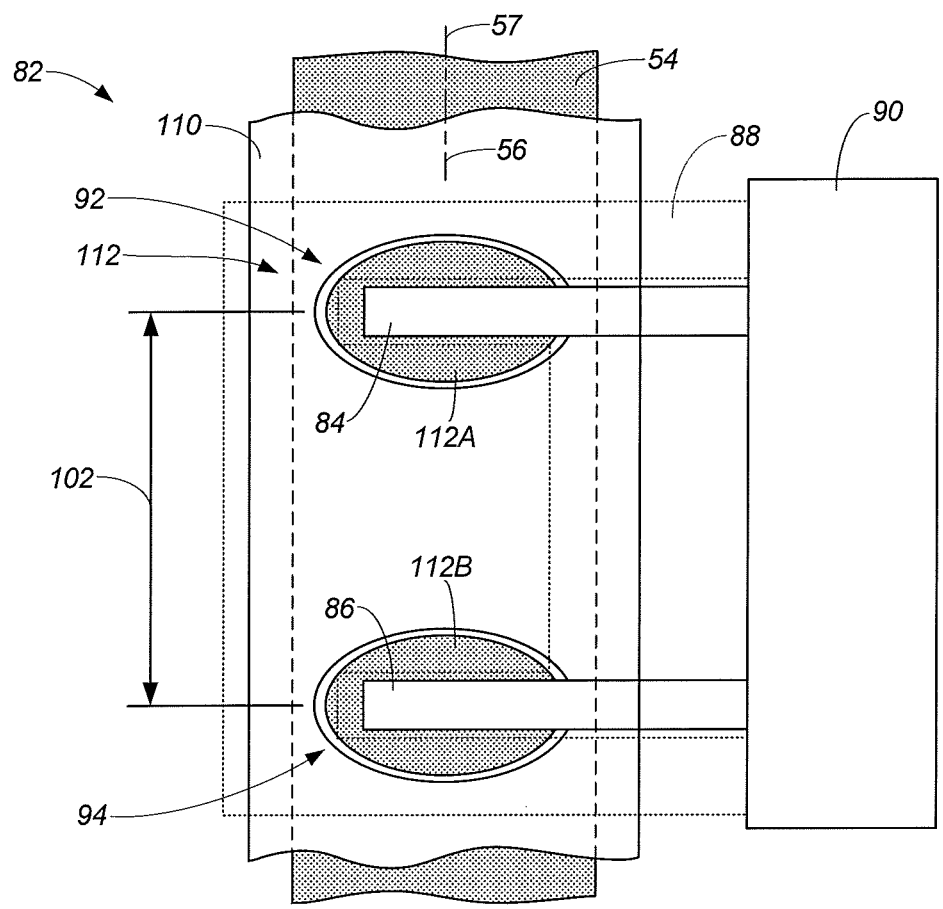
FIG. 4 is a simplified top plan view of a displacement sensor in accordance with embodiments of the present disclosure positioned adjacent a portion of a feed path with an excitation electrode shown in phantom lines.

In some embodiments, sense electrodes 84 and 86 are each offset from excitation electrode 88 by a gap, such as, a gap of about 5 mils in an exemplary embodiments, as shown in FIG. 3 and FIG. 4, which is a simplified top plan view of displacement sensor 82 in accordance with embodiments of the present disclosure positioned adjacent a portion of feed path 56, with the excitation electrode 88 shown in phantom lines. This arrangement allows sense electrode 84 and excitation electrode 88 to operate as a parallel-plate capacitor 92, and sense electrode 86 and excitation electrode 88 to function as a parallel-plate capacitor 94. It is understood that separate excitation electrodes may be used in combination with sense electrode 84 and sense electrode 86 to form the two parallel-plate capacitors 92 and 94. A suitable power source (not shown) is coupled to excitation electrode 88 to generate an electrical field 96 between sense electrode 84 and excitation electrode 88 (capacitor 92), and an electrical field 98 between sense electrode 86 and excitation electrode 88 (capacitor 94), as shown in FIG. 3.

While displacement sensor 82 is shown in use with conductive plates (i.e., sense electrode 84, sense electrode 86, and excitation electrode 88), displacement sensor 82 may alternatively include a variety of different conductive components that function in the same manner as sense electrode 84, sense electrode 86, and excitation electrode 88. As such, displacement sensor 82 may include a pair of sense components and an excitation component, where the excitation component is configured to generate a first electrical field between the excitation electrode 88 and the sense electrode 84 and a second electrical field between the excitation electrode 88 and the sense electrode 86.

In some embodiments, processing unit 90 includes a processor and other components, such as an analog-to-digital converter, for sampling capacitance signals from sense electrode 84 and sense electrode 86. The sampled capacitance signals may then be processed by a processor of processing unit 90, which includes one or more microprocessors that are configured to analyze the received sample signals and communicate with controller 46 over a suitable communication line 100 (FIG. 2). One suitable processing unit 90 is the 24-bit capacitance-to-digital converter chip AD7747 produced by Analog Devices of Norwood, Mass.

While processing unit 90 may be supported on the circuit board or other structure supporting sense electrode 84, sense electrode 86 and excitation electrode 88, it is understood that processing unit 90 may be displaced from the circuit board or the structure supporting sense electrode 84, sense electrode 86, and excitation electrode 88, such as on a separate circuit board (not shown). Thus, the processing unit 90, or components thereof, may be located outside of chamber 30 (FIG. 1) to reduce its exposure to elevated temperatures within chamber 30.

The capacitance sensed by sense electrodes 84 and 86 is dependent upon the proximity of filament 54 or surface 72 of filament 54 to sense electrodes 84 and 86. For instance, a relatively high capacitance is detected when surface 72 of filament 54 (e.g., dielectric constant of about 2 for the exemplary filament material ABS) is located in close proximity to sense electrodes 84 and 86, and a relatively low capacitance is sensed by sense electrodes 84 and 86 when surface 72 is displaced from sense electrodes 84 and 86 and sense electrodes 82 and 84 are adjacent to, for example, air (dielectric constant of 1). Thus, in the exemplary embodiment illustrated in FIG. 3, sense electrode 84 will sense a higher capacitance than sense electrode 86, because there is a smaller gap extends between filament 54 and sense electrode 84 relative to the gap between filament 54 and sense electrode 86.

More specifically, within an order of magnitude, the capacitance between sense electrode 82 or 84 and its surroundings will change by:

$$C = \frac{\varepsilon_0(\varepsilon_2 - \varepsilon_1)(d_1)(d_2)}{2d_3} \quad \text{(Equation 1)}$$

where $\varepsilon_0$ is the permittivity of free space, $\varepsilon_1$ is the dielectric constant of the air surrounding the electrode, $\varepsilon_2$ is the dielectric constant of filament 54, $d_1$ is a length of the electrode, and $d_2$ is a width of each electrode, which is measured in this example along the axis 57, and $d_3$ is a penetration distance of the electrical field (96 or 98) into the space next to the electrodes. Thus, for example, when the dielectric constant of the air surrounding the electrode ($\varepsilon_1$) is 1, the dielectric constant of filament 54 ($\varepsilon_2$) is 2, length of the electrode ($d_1$) is 10 mils, the width of the electrode ($d_2$) is 5 mils, and the distance the electrical field penetrates ($d_3$) is 5 mils, the capacitance (C) is approximately 2 femto-Farads.

As filament 54 is fed along feed path 56 relative to the displacement sensor 82, the pattern 78 formed in surface 72 produces a periodic variation in the capacitance sensed by sense electrodes 84 and 86 due to the varying gap between filament 54 and sense electrodes 84 and 86.

In some embodiments, the capacitances sensed by electrodes 84 and 86 are substantially in quadrature. In some embodiments, sense electrodes 84 and 86 are positioned to be out of phase from each other relative to pattern 78, such as 90° out of phase as shown in FIG. 3. That is, in some embodiments, sense electrodes 84 and 86 are displaced from each other along longitudinal axis 57 a distance 102 that is equal to n*L+/-0.25 L, where n is a positive or negative integer and L is the period length 83, as shown in FIG. 3. In some embodiments, when sense electrode 84 is positioned at a location along feed path 56 that corresponds to one of the peaks 81 of pattern 78, sense electrode 86 is positioned at a location along feed path 56 that is between one of the peaks 81 and a valley 80, as shown in FIG. 3. As a result, when pattern 78 has a consistent period length 83, the capacitance sensed by electrode 84 will be 90° out of phase from the capacitance sensed by electrode 86. Processing unit 90 uses the capacitances sensed by electrodes 84 and 86 to provide quadrature detection of the direction of motion of filament 54 along the feed path 56 relative to displacement sensor 82, in accordance with conventional quadrature detection calculations.

The capacitances sensed by electrodes 84 and 86 generally vary with time in a sinusoidal pattern as filament 54 is fed along feed path 56 in a single direction. In some embodiments, the velocity at which filament 54 is fed along feed path 56 is determined by processing unit 90 or controller 46 based on a frequency of the sinusoidal pattern of at least one of the capacitances sensed by electrodes 84 and 86. As the cross-sectional area of filament 54 is known, in some embodiments, processing unit 90 or controller 46 can calculate the volumetric flow rate of filament 54 into liquefier assembly 58. This volumetric flow rate is then used to determine the volumetric flow or extrusion rate at which the molten filament material is discharged from liquefier assembly 58 (FIG. 2).

In some embodiments, system 10 is configured to detect a loss of extrusion of molten filament material through liquefier assembly 58 using the capacitances sensed by electrodes 84 and 86. A loss of extrusion may occur when the back pressure at liquefier assembly 58 disrupts the feeding of filament 54 by drive mechanism 52 into liquefier assembly 58. In some embodiments, processing unit 90 or controller 46 compare the calculated velocity at which filament 54 is fed along axis 56 into liquefier assembly 58 based on the capacitances sensed by electrodes 84 and 86 to a threshold value. The threshold value relates to an expected velocity at which filament 54 is should be moving based on the control of drive mechanism 52, such as the rotational velocity of drive wheel 66, for example. When the calculated velocity is at or below the threshold value, a loss of extrusion is detected.

Since different filaments 54 will have different diameters and dielectric constants, the precise position of filament 54 relative to sense electrodes 84 and 86 is not apparent until filament 54 has moved about a period length 83, at which point the maximum and minimum capacitances sensed by electrodes 84 and 86 will be detected, and the precise position of filament 54 is known. For example, if the capacitance sensed by electrode 84 is:

$$C_u(t) = C_{up} + \Delta C_{up}\sin(kx(t)) \quad \text{(Equation 2)}$$

and the capacitance sensed by electrode 86 is:

$$C_d(t) = C_{dn} + \Delta C_{dn}\cos(kx(t)) \quad \text{(Equation 3)}$$

(where k is $2\pi$ divided by period length 83), the position of filament 54 (modulo a period length 83) is:

$$x(t) = \frac{\operatorname{atan}\left\{\dfrac{C_u(t) - C_{up}}{\Delta C_{up}} \dfrac{\Delta C_{dn}}{C_d(t) - C_{dn}}\right\}}{k}. \quad \text{(Equation 4)}$$

(where $C_{up}$ can be determined from the signals by monitoring the capacitance while the filament is advances under an open loop control while several grooves or indents from the gear teeth pass by the sensor)

Though the need to measure material-related parameters such as $C_{up}$ requires calibration when filament 54 having a different material type is loaded into system 10, there is additional information in these constants. The effective dielectric constant changes with water content, filler content, and polymer type. The measured capacitances vary with filament diameter and ovality. So, although these various material effects cancel when sensor 82 is calibrated, the calibration constants provide information about the filament material being extruded. Dust or contamination can cause drifts in the constants; the sensor may continuously monitor the maximum and minimum capacitance signals observed, and adjust the constants as necessary.

One advantage to the use of a prefabricated pattern 78 in surface 72 of filament 54, is that period length 83 can be precisely controlled to be consistent along the length of filament 54. In contrast, period length 83 of pattern 78 formed through the engagement between surfaced 72 and textured surface 70 of filament drive 62 may vary in response to back pressure from liquefier assembly 58. This variation in period length 83 can reduce the accuracy of the estimation of the velocity in which filament 54 is being fed into liquefier assembly 58 and, thus, reduce the accuracy of the corresponding volumetric flow rate calculation, or the accuracy at which a loss of extrusion may be detected.

In some embodiments, print head 18 includes a housing 110, through which feed path 56 and filament 54 extend, as shown in FIGS. 2 and 4. In some embodiments, housing 110 includes at least one opening, generally referred to as 112, positioned between feed path 56 and filament 54 and sense electrodes 84 and 86, as shown in FIG. 4. In some embodiments, the at least one opening 112 includes an opening 112A positioned between filament 54 and sense electrode 84, and an opening 112B positioned between filament 54 and sense electrode 86. In some embodiments, openings 112A and 112B are positioned such that a radial line extending from longitudinal axis 57 of filament 54 extends through filament 54, through opening 112A and through sense electrode 84, and another radial line extending from longitudinal axis 57 of filament 54 extends through filament 54, through opening 112B, and through sense electrode 86.

In some embodiments, displacement sensor 82 is positioned downstream of drive mechanism 52 relative to the primary feed direction of filament 54 toward liquefier assembly 58, as shown in FIG. 2. In some embodiments, housing 110 is in the form of a liquefier tube of liquefier assembly 58, which prevents filament 54 from buckling during feeding of filament 54 into liquefier assembly 58, as shown in FIG. 2.

In some embodiments, displacement sensor 82 is located upstream of drive mechanism 52 relative to the primary feed direction of filament 54, as indicated in phantom lines in FIG. 2. In some embodiments, housing 110 includes a structure that is used to guide filament 54 into drive mechanism 52. This embodiment requires the use of filament 54 having the prefabricated pattern 78 formed in surface 72.

Additional embodiments are directed to a method of sensing a velocity and direction in which filament 54 is fed into a liquefier assembly 58 of an extrusion-based digital manufacturing system 10. As discussed above, the velocity in which filament 54 is fed into liquefier assembly may be used to determine the volumetric flow or extrusion rate at which the molten filament material is discharged from liquefier assembly 58 (FIG. 2).

In some embodiments, filament 54 is fed along feed path 56 using drive mechanism 52, which is formed in accordance with one or more embodiments of the present disclosure. A first capacitance that varies in response to this feeding of filament 54 along feed path 56 is sensed using sense electrode 84 that is positioned adjacent feed path 56, as shown in FIGS. 3 and 4. A second capacitance that varies in response to the feeding of filament 54 along feed path 56 is sensed using sense electrode 86 that is positioned adjacent feed path 56, as shown in FIGS. 3 and 4. The velocity and direction in which filament 54 is fed along feed path 56 are determined using a processor of processing unit 90 or controller 46 based on the sensed capacitances. In some embodiments, processing unit 90 uses quadrature detection to determine the direction in which filament 54 is fed along feed path 56 as previously discussed.

In some embodiments of the method, filament 54 comprises pattern 78 in surface 72 that is periodic along a longitudinal axis 57 of filament 54 that is generally oriented with feed path 56. The capacitances sensed using sense electrodes 84 and 86 vary in response to movement of pattern 78 past sense electrodes 84 and 86. In some embodiments, the capacitances sensed using sense electrode 84 correspond to sections of pattern 78 that are different from the sections of pattern 78 corresponding to the capacitances sensed using sense electrode 86. For instance, in some embodiments, pattern 78 in surface 72 of filament 54 has a period length 102 measured along the longitudinal axis of filament 54 or feed path 56. Sense electrode 84 is positioned at a location along feed path 56 that is displaced from sense electrode 86 a distance that is different than a whole number of period lengths 102. As a result, sense electrodes 84 and 86 are positioned out of phase to the periodic pattern 78 in surface 72, such as 90° out of phase. This allows for quadrature detection of the direction of motion of filament 54 along feed path 56, in accordance with conventional quadrature calculations. Thus, in some embodiments, processing unit 90 or controller 46 determines the direction of motion of filament 54 along feed path 56 based on the capacitances sensed using electrodes 84 and 86.

In some embodiments, the velocity at which filament 54 is fed along feed path 56 relative to sense electrodes 84 and 86 is determined by processing unit 90 or controller 46 based on a frequency of the varying capacitance sensed by at least on the electrodes 84 and 86. In some embodiments, this velocity and the known cross-sectional area of filament 54 are used by processing unit 90 or controller 46 to determine the volumetric flow or extrusion rate at which the molten filament material is discharged from liquefier assembly 58 (FIG. 2).

In some embodiments, a loss of extrusion is detected by the processing unit or controller 46 when the calculated velocity at which filament 54 is fed into liquefier assembly 58 drops below a threshold value, as discussed above. In some embodiments, controller 46 issues a notification of the filament feeding error, such as an alarm, or interrupts the current print operation.

In some embodiments, filament 54 is fed along feed path 56 using a filament drive 62 of drive mechanism 52. In some embodiments, the method involves forming pattern 78 in surface 72 of filament 54 in response to feeding filament 54 along feed path 56 using filament drive 62. In some embodiments, filament drive 62 includes a drive wheel 66, and drive mechanism 52 includes a motor. Filament 54 is fed along feed path 56 by driving rotation of drive wheel 66 using motor 64.

In some embodiments, filament 54 is fed through housing 110. In some embodiments, sense electrode 84 is positioned within or over an opening in the housing, such as opening 112A, that exposes a portion of filament 54 to sense electrode 84, and sense electrode 86 is positioned within or over an opening in the housing, such as opening 112B, that exposes a portion of filament 54 to sense electrode 86, as shown in FIG. 4.

Although the present disclosure has been described with reference to preferred embodiments, workers skilled in the art will recognize that changes may be made in form and detail without departing from the spirit and scope of the disclosure.

The invention claimed is:

1. A filament feeding device for use in feeding a filament into a liquefier assembly of an extrusion-based digital manufacturing system, the filament feeding assembly comprising:
   a drive mechanism configured to feed a filament along a feed path; and
   a displacement sensor adjacent the feed path, the displacement sensor comprising a first sense electrode positioned adjacent the feed path in a first location and configured to sense a first capacitance, and a second sense electrode positioned adjacent the feed path in a second location spaced from the first location and configured to sense a second capacitance, wherein the displacement sensor is configured to determine a velocity and direction in which the filament is fed along the feed path based on at least the first and the second sensed capacitances.

2. The filament feeding device according to claim 1, wherein the first sense electrode is a first parallel-plate capacitor and the second sense electrode is a second parallel-plate capacitor.

3. The filament feeding device according to claim 2, wherein:
the displacement sensor comprises at least one excitation electrode; and
the first parallel-plate capacitor includes a first sense electrode and one of the at least one excitation electrode; and
the second parallel-plate capacitor includes a second sense electrode and one of the at least one excitation electrode.

4. The filament feeding device according to claim 3, wherein the first and second sensed capacitances are spaced a first distance apart that is different from a second periodic distance between a repeating surface pattern on the filament such that velocity of the filament can be determined through quadrature analysis.

5. The filament feeding device according to claim 4, wherein the first and second sensed capacitances vary in response to movement of the surface pattern on the filament along the feed path relative to the first and second sense electrodes.

6. The filament feeding device according to claim 5, wherein the surface pattern of the filament comprises a series of detents in the surface of the filament having the periodic distance.

7. The filament feeding device according to claim 6, wherein the drive mechanism comprises a filament drive having a textured engagement surface that engages the filament and creates the surface pattern in the filament having the periodic distance.

8. The filament feeding device according to claim 7, wherein the filament drive comprises a drive wheel having teeth that engage the filament and create the pattern in the surface of the filament, and the drive mechanism comprises a motor configured to drive rotation of the drive wheel.

9. The filament feeding device according to claim 4, wherein the first distance is different than a whole number of the second periodic distance.

10. The filament feeding device according to claim 9, wherein:
the surface pattern comprises a series of valleys in the surface of the filament that are displaced from each other along the longitudinal axis of the filament; and
the first and second sense electrodes are displaced along the longitudinal axis such that when the first sense electrode is positioned at a location along the longitudinal axis corresponding to one of the valleys, the second sense electrode is positioned at a location along the longitudinal axis corresponding to a position in the pattern that is displaced from the valleys.

11. The filament feeding device according to claim 10, wherein the first sense electrode is positioned at a location along the longitudinal axis corresponding to one of the valleys of the pattern when the second sense electrode is positioned at a location along the longitudinal axis between two adjacent valleys.

12. The filament feeding device according to claim 3, and further comprising:
a housing having the feed path extending therethrough, the housing comprising first and second spaced apart openings in communication with the feed path; and
the first and second sense electrodes are suspended over the first and second openings in the housing.

13. The filament feeding device according to claim 12, wherein the housing comprises a liquefier tube, wherein the liquefier tube includes a portion of the feed path.

* * * * *